US012356893B2

(12) United States Patent
Tschirdewahn et al.

(10) Patent No.: US 12,356,893 B2
(45) Date of Patent: Jul. 15, 2025

(54) FORAGE HARVESTER REPLACEABLE WEAR PLATE

(71) Applicant: AGCO International GmbH, Neuhausen (CH)

(72) Inventors: Wilhelm Tschirdewahn, Marktoberdorf (DE); Helge Lindenmuller, Windach (DE)

(73) Assignee: AGCO International GmbH, Neuhausen (CH)

( * ) Notice: Subject to any disclaimer, the term of this patent is extended or adjusted under 35 U.S.C. 154(b) by 795 days.

(21) Appl. No.: 17/645,795

(22) Filed: Dec. 23, 2021

(65) Prior Publication Data

US 2022/0192096 A1    Jun. 23, 2022

(30) Foreign Application Priority Data

Dec. 23, 2020    (GB) .................................... 2020459

(51) Int. Cl.
  *A01D 75/00*   (2006.01)
  *A01D 67/00*   (2006.01)
  *B02C 17/00*   (2006.01)

(52) U.S. Cl.
  CPC ............ *A01D 75/00* (2013.01); *A01D 67/00* (2013.01); *B02C 17/00* (2013.01); *B02C 2210/02* (2013.01)

(58) Field of Classification Search
  CPC ...... A01D 75/00; A01D 67/00; A01D 43/081; A01F 29/06; A01F 29/09; B02C 17/00; B02C 2210/02
  See application file for complete search history.

(56) References Cited

U.S. PATENT DOCUMENTS

| 1,109,459 | A | * | 9/1914 | Posslet | B02C 17/02 |
| | | | | | 241/182 |
| 2,829,481 | A | * | 4/1958 | Jarvis | A01F 29/095 |
| | | | | | 56/14.4 |
| 4,257,566 | A | * | 3/1981 | Lawrence | A01F 29/095 |
| | | | | | 241/294 |
| 4,383,652 | A | | 5/1983 | Osborne et al. | |
| 4,715,450 | A | * | 12/1987 | Hallissy | E02F 3/8152 |
| | | | | | 172/701.3 |
| 5,259,692 | A | * | 11/1993 | Beller | E02F 3/188 |
| | | | | | 404/90 |

(Continued)

FOREIGN PATENT DOCUMENTS

| CA | 2 328 744 C | 9/2003 | |
| DE | 202016105162 U1 * | 11/2016 | ............. A01F 29/06 |

(Continued)

OTHER PUBLICATIONS

UK Intellectual Property Office, Search report for related UK Application No. GB2020459.0, dated Jun. 7, 2021.

(Continued)

*Primary Examiner* — Arpad Fabian-Kovacs

(57) ABSTRACT

A wear plate assembly for an agricultural harvester including a support element having a number of lateral regions, each lateral region being provided with a plurality of first engagement features, one or more replaceable wear plates provided on one side with a plurality of second engagement features for engagement with the first engagement features, and a plurality of fastenings to secure each replaceable wear plate to the support through the engagement features.

7 Claims, 8 Drawing Sheets

(56) References Cited

U.S. PATENT DOCUMENTS

| | | | | |
|---|---|---|---|---|
| 5,964,080 A | * | 10/1999 | Leeb | A01D 43/086 |
| | | | | 56/156 |
| 6,311,463 B1 | * | 11/2001 | Mellin | A01D 34/736 |
| | | | | 56/13.6 |
| 7,137,237 B2 | * | 11/2006 | Van Vooren | A01D 87/10 |
| | | | | 406/99 |
| 7,631,441 B2 | * | 12/2009 | Hunt | E01H 5/061 |
| | | | | 37/232 |
| 2012/0233974 A1 | * | 9/2012 | Cormier | A01D 57/20 |
| | | | | 56/181 |
| 2016/0031095 A1 | | 2/2016 | Beard et al. | |
| 2016/0333547 A1 | | 11/2016 | Winter et al. | |
| 2018/0279554 A1 | * | 10/2018 | Peters | B65G 23/06 |
| 2019/0104684 A1 | * | 4/2019 | Hasenour | A01D 57/06 |

FOREIGN PATENT DOCUMENTS

| | | | | |
|---|---|---|---|---|
| DE | 102019116945 A1 | * | 12/2020 | ............ A01D 34/52 |
| JP | 2000126976 A | | 5/2000 | |

OTHER PUBLICATIONS

European Patent Office, Search Report related to European Patent Application No. EP21207441.3, dated Apr. 11, 2022.

* cited by examiner

FORAGE HARVESTER REPLACEABLE WEAR PLATE

FIELD OF THE INVENTION

The present invention relates to an agricultural harvester, in particular a self-propelled forage harvester for use in cutting an agricultural crop, for example cutting corn and grass for stock feed and further in relation to a replaceable wear plate for such a harvester.

BACKGROUND

During operation of a forage harvester agricultural crop is fed into the forage harvester and comminuted or rendered into smaller particles on its passage through the forage harvester before being discharged. The comminuted crop causes particular wear on some of the surfaces that it impacts upon when travelling through the harvester. For example, this can be a particular problem in relation to the surfaces in a chopper drum housing or a blower housing.

To address this problem replaceable wear plates have been developed to provide improved longevity to these regions of the forage harvester. In known systems, the wear plate may be held in place by screwing of the wear plate to a suitable support. It will be understood that removing the screws to allow the wear plate to be removed and replaced can be awkward, tedious and time consuming for the operator. In particular this may require some disassembly of the associated housing to permit access to the screws.

Additionally, the screws may become loose due to vibration during operation of the forage harvester and may subsequently be drawn into the processed crop and then into the resulting animal feed, causing a risk of harm to any animals consuming the feed. Alternatively, or additionally, during transit through the forage harvester the screws may interfere with other elements of the forage harvester as they pass through the forage harvester causing damage to such other elements.

Further should all of the screws become loose there is a danger that the wear plate itself may become dislodged and drawn into the flow of crop through the forage harvester. At best the dislodged wear plate may cause a blockage, but potentially the dislodged wear plate could interfere with other elements of the forage harvester as it passes through the forage harvester causing damage to such other elements.

It is an advantage of the present invention that it provides an improved wear plate assembly for use in an agricultural harvester such as a forage harvester.

SUMMARY OF THE INVENTION

According to a first aspect of the present invention, a wear plate assembly for an agricultural harvester comprises a support element having a number of lateral regions, the or each lateral region being provided with a plurality of first engagement features, one or more replaceable wear plates provided on a first side with a plurality of second engagement features for engagement with the first engagement features, and a plurality of fastenings to secure the or each replaceable wear plate to the support element through the engagement features.

Preferably, each of the first engagement features comprises a female fitting and each of the second engagement features comprises a male fitting for engagement with a respective female fitting.

Preferably, each of the first engagement features comprises a tubular member having an internal section and each of the second engagement features comprises a tubular member having an external section sized for seating within the internal section of the first engagement feature.

Preferably each of the first engagement features is provided with an end portion having a threaded opening, each of the second engagement features is provided with an internal threaded opening and wherein each of the plurality of fastenings is a threaded fastening adapted to engage with each of the threaded opening and the internal threaded opening to secure the or each replaceable wear plate to the support.

Preferably the one or more replaceable wear plates comprises first and second replaceable wear plates.

According to a second aspect of the invention, an agricultural harvester comprises a wear plate assembly according to the first aspect of the present invention.

Preferably, the agricultural harvester further comprises a shear bar assembly to which the support element of the wear plate assembly is mounted.

According to a third aspect of the present invention a method of assembly of a wear plate assembly according to the first aspect of the invention comprises the steps of locating a first replaceable wear plate such that the second engagement features are seated within the first engagement features, introducing each of the plurality of fastening members through an associated first engagement feature of the support element and into an associated second engagement feature to secure the first replaceable wear plate to the support element through the first and second engagement features.

Preferably where the wear plate assembly includes a second replaceable wear plate the method further comprises locating the second replaceable wear plate such that the first engagement features are seated within the second engagement features, introducing each of the plurality of fastening members through an associated first engagement feature of the support element and into an associated second engagement feature to secure the second replaceable wear plate to the support element through the first and second engagement features.

BRIEF DESCRIPTION OF THE DRAWINGS

The invention will now be described, by way of example only, with reference to the accompanying drawings, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel.

Figure 1:
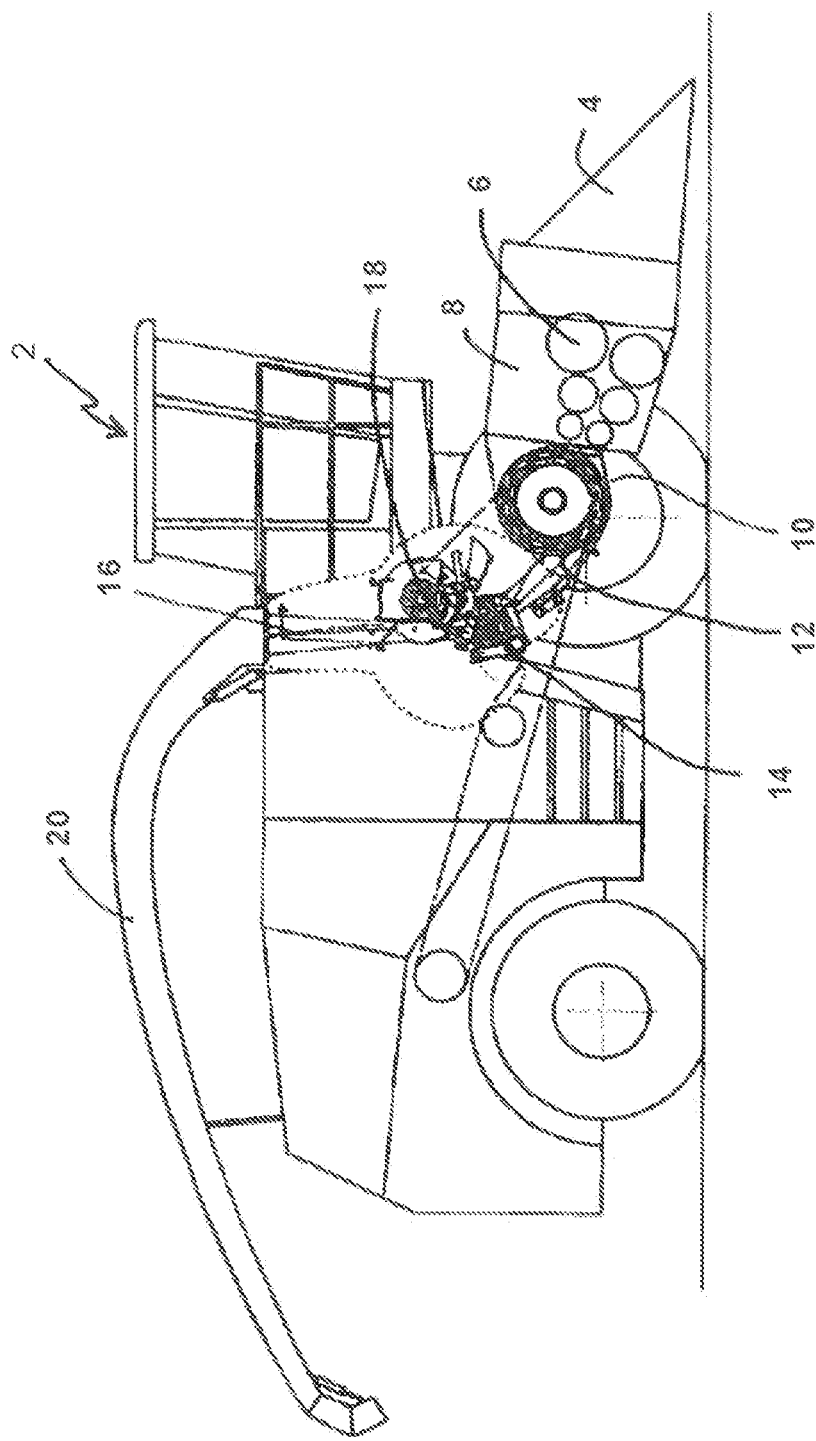
FIG. 1 shows a schematic side view of a forage harvester for use with the present invention.

With reference to FIG. 1, in a schematic side view the main components of a forage harvester 2 are shown. The forage harvester 2 is provided with a front attachment 4 which contains cutting equipment for cutting a crop. The cut crop is then fed through a series of compression rollers 6 in a compression roller housing 8 to a chopper drum assembly 10 where the crop is chopped into smaller pieces between a shear bar 30 and a plurality of chopper knives 36 mounted on a chopper drum 22. The chopped crop next passes through a first duct 12 and, in the illustrated embodiment, is fed through a cracker unit 14 where the crop is further crushed and threshed. The harvested crop is then blown upwards along a second duct 16 by an accelerator 18 and exits through a spout 20. In an alternative embodiment, the chopped crop may optionally pass directly from the chopper drum assembly 10 to the second duct 16.

In describing the present invention the term 'inner' is used to describe those elements of the invention which are, in use, closer to an axis of rotation of the chopper drum and 'outer' the opposite. Similarly references to 'upper' and 'lower' are to be understood with reference to the forage harvester in position on level ground.

Figure 2:
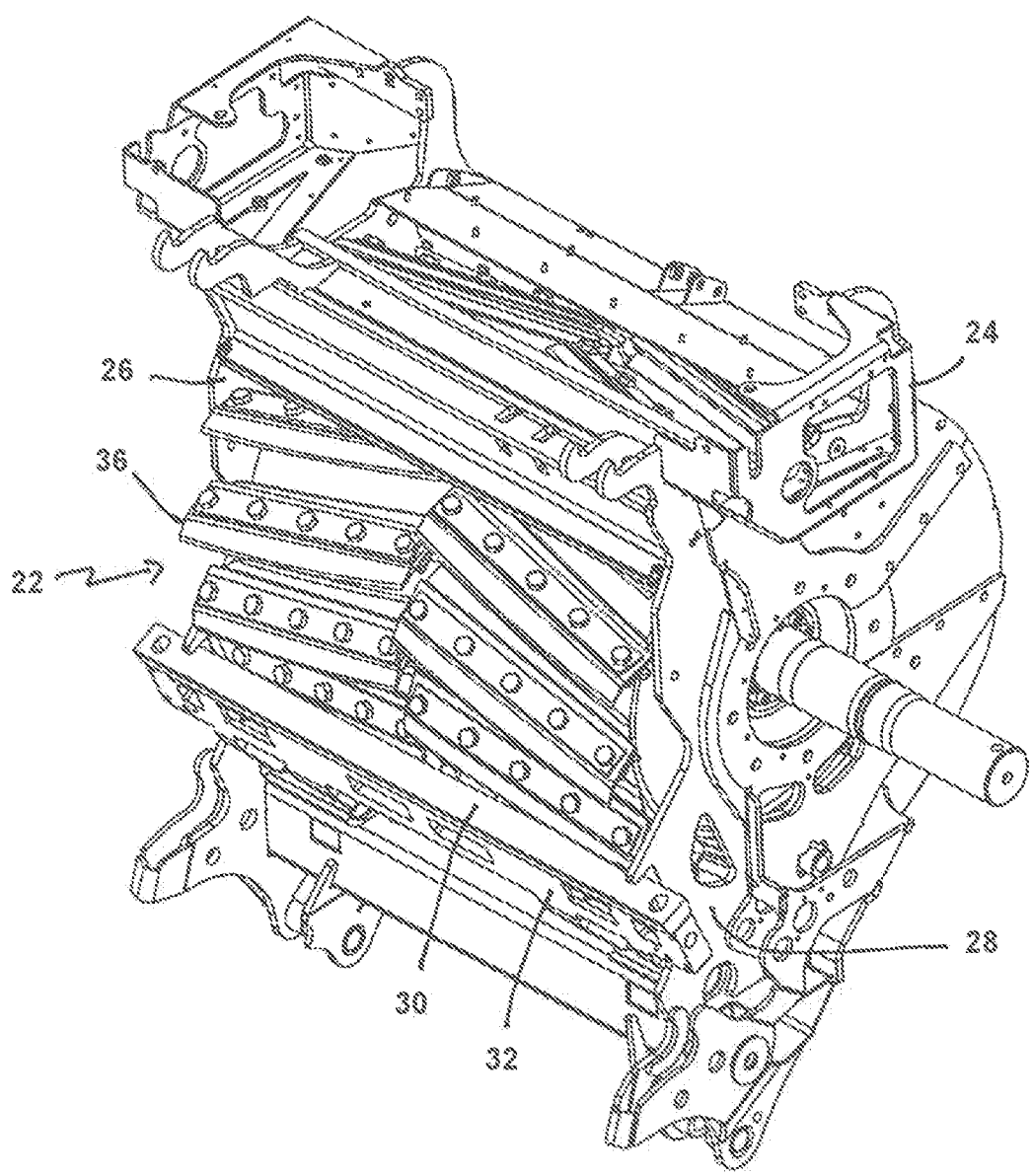
FIG. 2 shows a perspective view of a chopper drum assembly suitable for use with the present invention.
Figure 3:
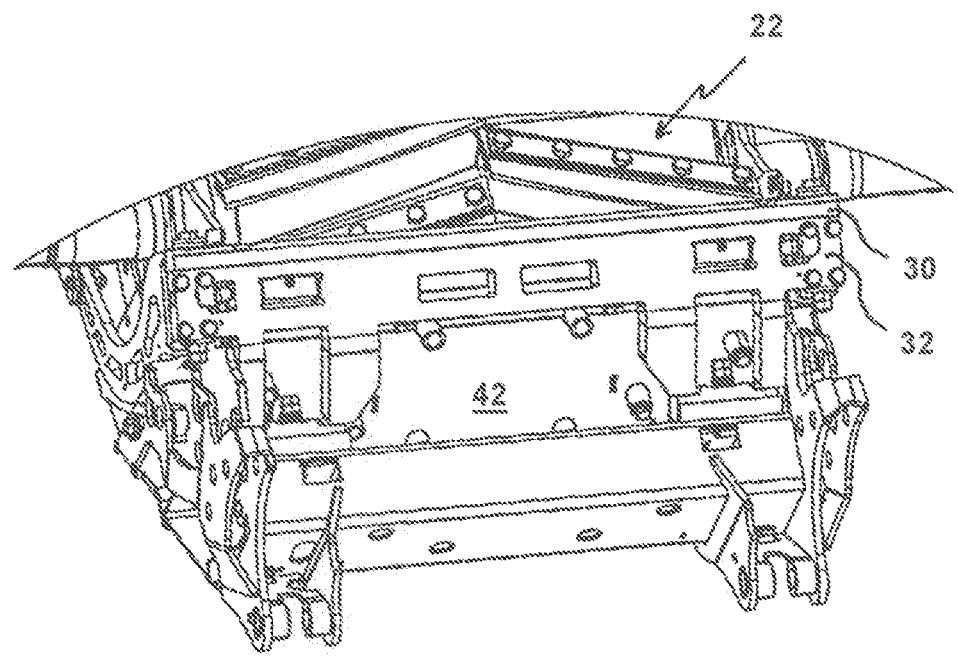
FIG. 3 shows a view from below of the chopper drum assembly of FIG. 2 showing a portion of a wear plate assembly in accordance with the present invention.
Figure 4:
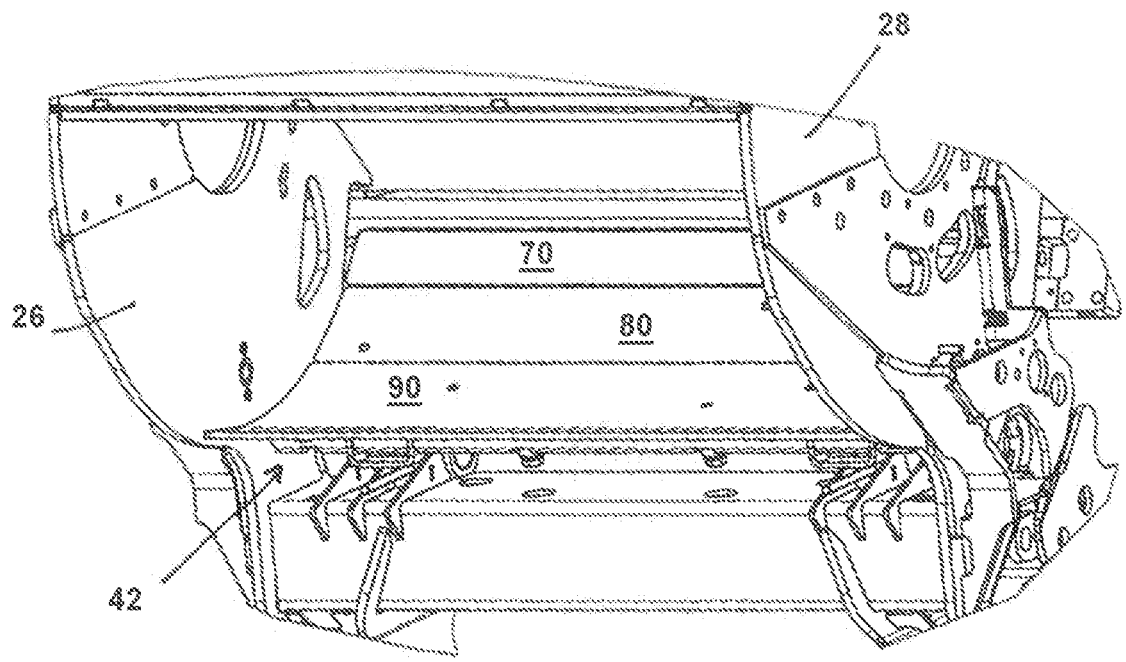
FIG. 4 shows a perspective view of a lower portion of the chopper drum assembly from which the chopper drum has been omitted to show a portion of a wear plate assembly in accordance with the present invention.

FIG. 2 shows a perspective view of a chopper drum assembly 10 incorporating the present invention. The chopper drum 22 is supported for rotation within a frame. The chopper drum 22 is driven about a central longitudinal axis by any suitable means. An upper end of the frame is provided with a housing 24 within which a sharpening apparatus may be located. The frame is provided with first and second parallel side walls 26, 28.

The chopper drum 22 is mounted in central portion of the frame supported between the side walls 26, 28. The frame is further provided with further mounting means to enable the frame to be located in a suitable position within the forage harvester 2.

A shear bar 30 is mounted to an upper part of a shear bar holder 32. The shear bar holder 32 is supported from the frame in a known manner so as to be pivoted about an axis 33 extending through a lower part of the shear bar holder 32. Pivoting of the shear bar holder about this axis enables a distance between the blades of the chopper knives 36 and an edge of the shear bar 30 to be adjusted and set.

Elements of a wear plate assembly 40 in accordance with the present invention may best be seen in FIGS. 6 to 9. The wear plate assembly 40 comprises a support element 42 and at least one replaceable wear plate. In the illustrated embodiment, two such replaceable wear plates 80, 90 are shown.

The support element 42 comprises a generally planar portion 44 with a lip 46 towards a second end. The generally planar portion 44 is provided at a first end with an angled portion 44'. The lip 46 is provided at a number of locations with a locating surface 48. In the illustrated embodiment two such locating surfaces 48 are shown. The locating surfaces 48 are attached to the support element in any suitable manner, for example by welding.

Figure 12:
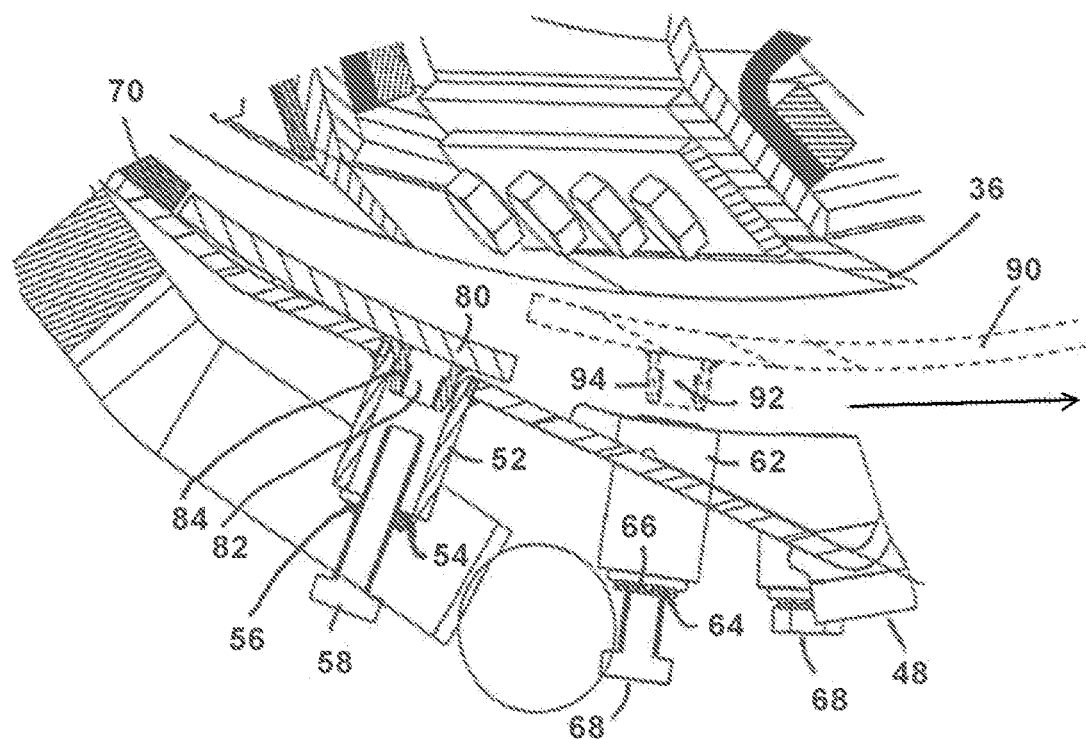
FIG. 12 shows a side section showing removal of the second replaceable wear plate of the wear plate assembly.

The generally planar portion 44 is provided in a first lateral region 44" with a plurality of first openings 50. Each first opening 50 is provided with a generally tubular element 52 secured to an outer surface of the generally planar portion 44. A first end of each generally tubular element 52 may be secured to the generally planar portion 44 within a first opening 50 in any suitable manner, for example by welding. Alternatively, a first end of each generally tubular element 52 may be secured to the generally planar portion 44 about a first opening 50, such that the first opening 50 and an inner part of each generally tubular element 52 are aligned. An outer end of each generally tubular element 52 is provided with an aperture 54 (FIG. 12). The first openings 50 and the associated tubular elements 52 may be of any suitable shape.

In the illustrated embodiment four such first openings 50 (and the associated tubular elements 52 are provided in the first lateral region 44": two in an upper central part and two in a lower part, each located towards an end of the first lateral region 44". Other numbers and distributions of the first openings 50 are possible.

Figure 13:
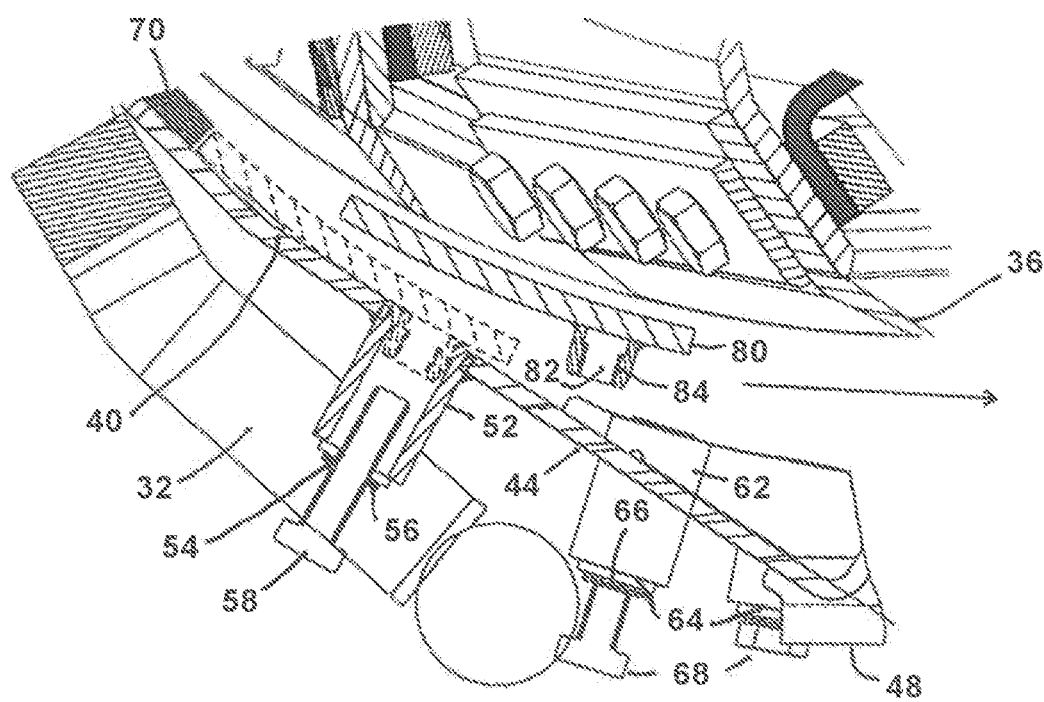
FIG. 13 shows a side section showing removal of the first replaceable wear plate of the wear plate assembly.

The generally planar portion 44 is provided in a second lateral region 44''' with a plurality of second openings 60. Each second opening 60 is provided with a generally tubular element 62 extending through the generally planar portion 44. Each generally tubular element 62 may be secured within a second opening 60 to the generally planar portion 44 in any suitable manner, for example by welding. An outer end of each generally tubular element 62 is provided with an aperture 64 (FIG. 13). The first openings 60 and the associated tubular elements 62 may be of any suitable shape.

In the illustrated embodiment four such second openings 60 (and the associated tubular elements 62) are provided in the second lateral region 44''': two in a lower central part having a first lateral spacing and two in an upper part, having a second lateral spacing greater than the first. Other numbers and arrangements of the second openings are possible.

Figure 5:
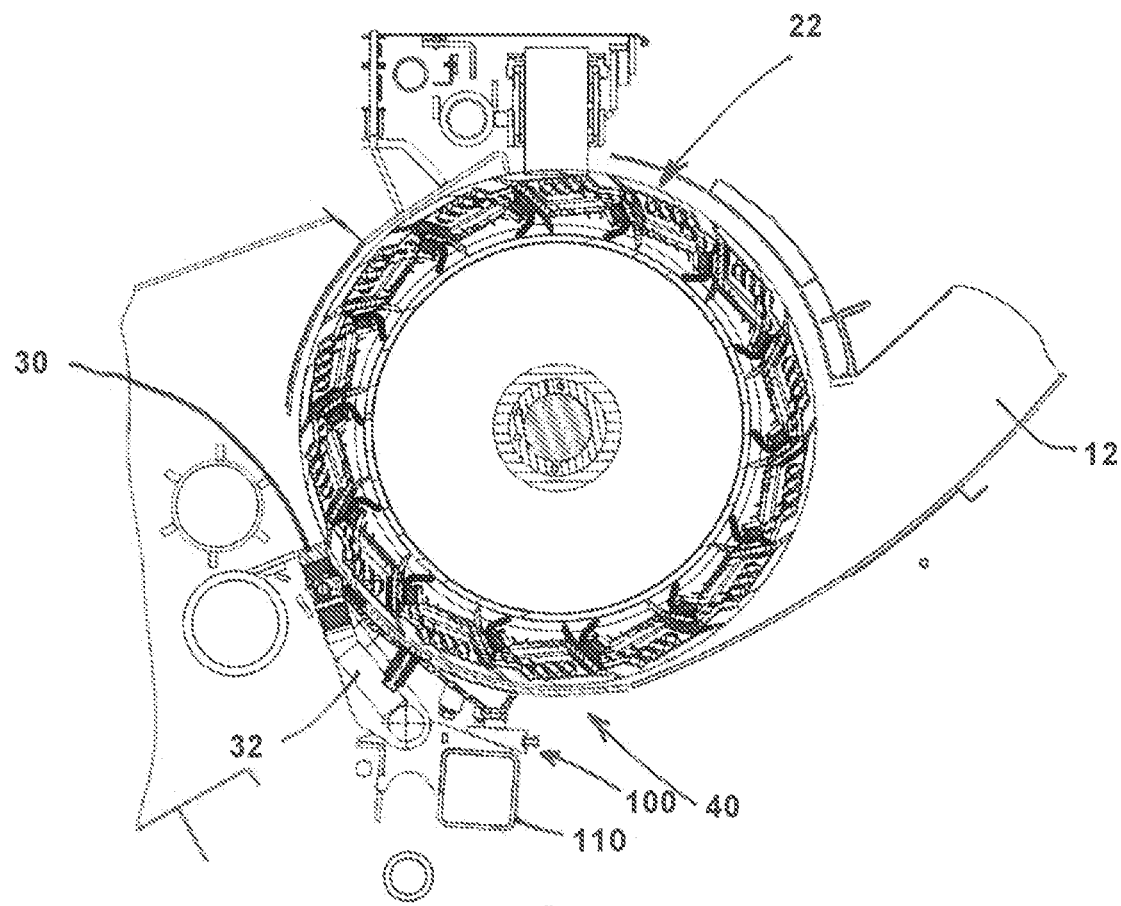
FIG. 5 shows a side section of the chopper drum assembly together with other elements of a forage harvester.
Figure 5A:
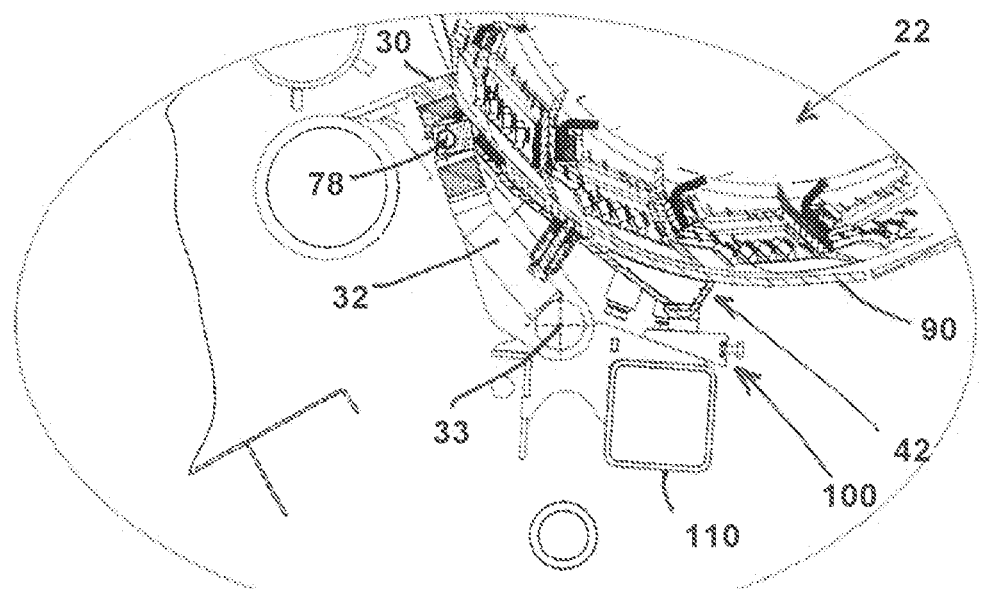
FIG. 5A shows a detail of a lower portion of FIG. 5.
Figure 6:
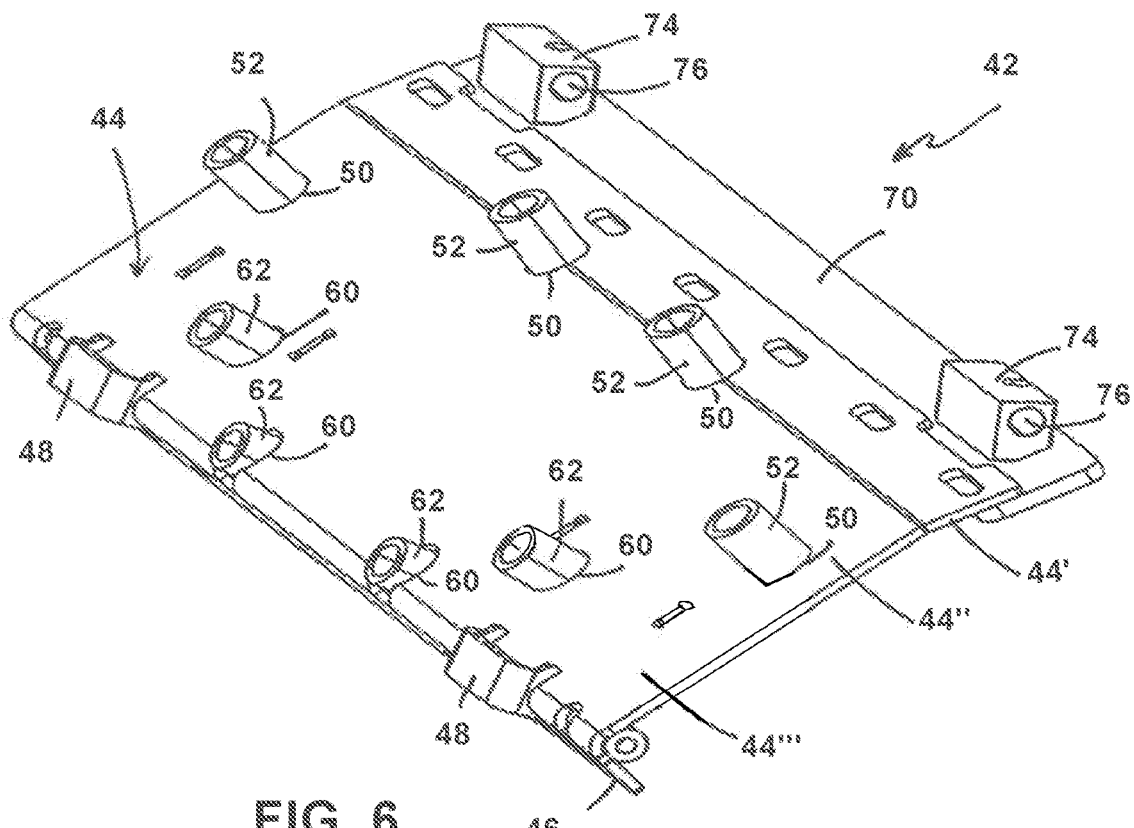
FIG. 6 shows a perspective view from below of a support element forming a part of a wear plate assembly in accordance with the present invention.
Figure 7:
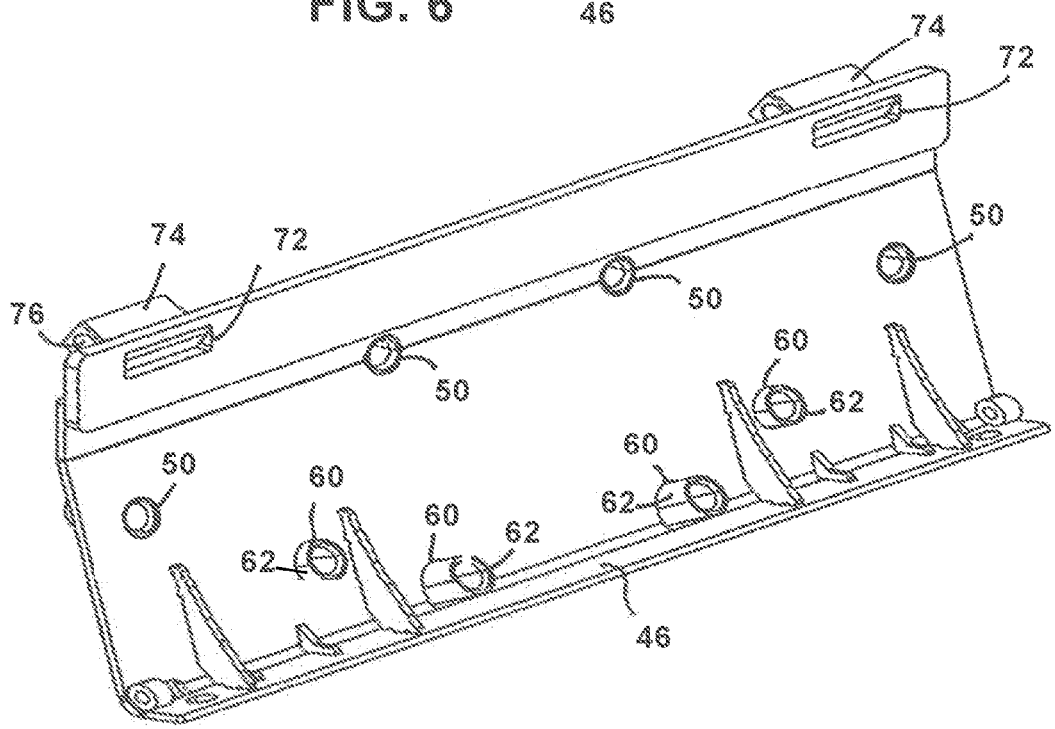
FIG. 7 shows a perspective view from above of the support element of FIG. 6.
Figure 8:
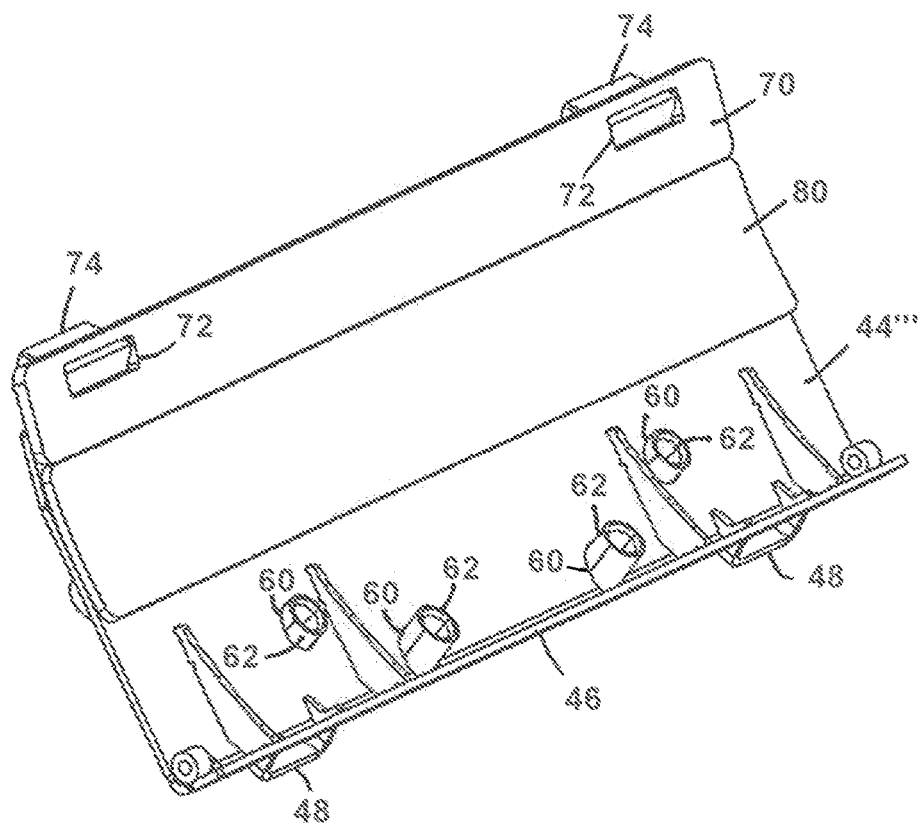
FIG. 8 shows view similar to that of FIG. 7 illustrating a first replaceable wear plate attached to the support element.
Figure 9:
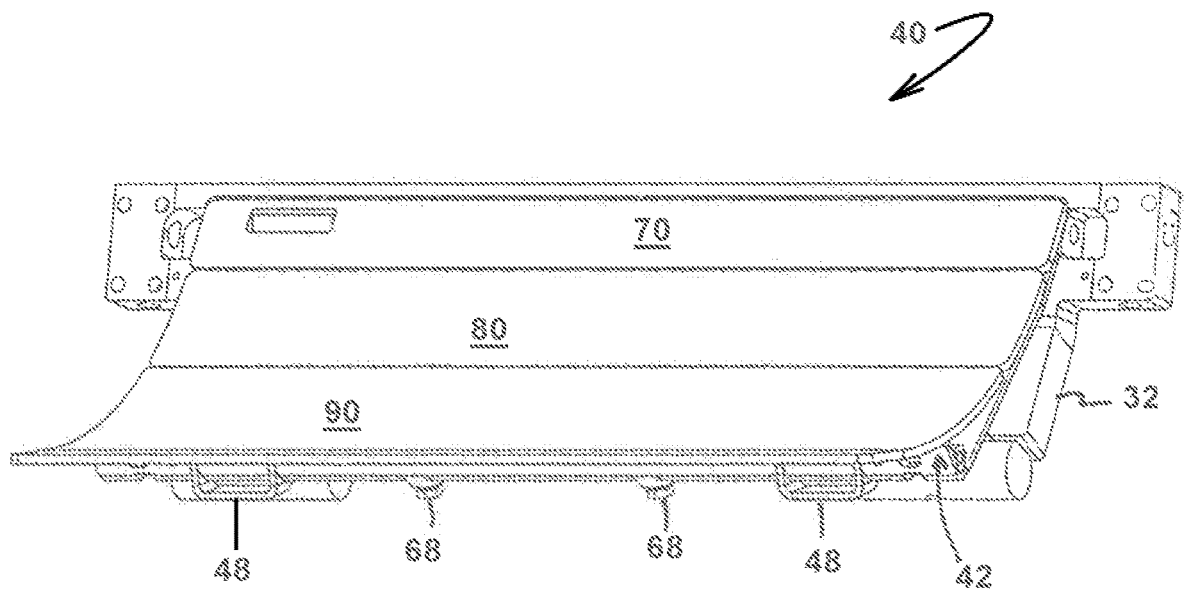
FIG. 9 shows the support element fitted with both a first and a second replaceable wear plate.
Figure 10:
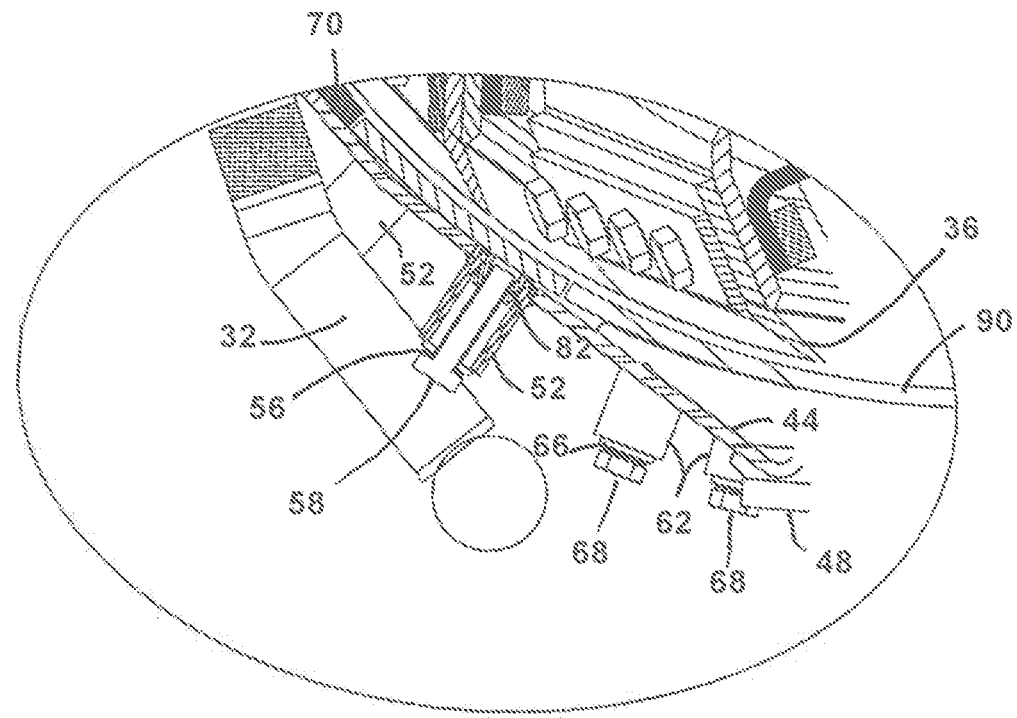
FIG. 10 shows a detail of a first section of a wear plate assembly according to the invention mounted in a chopper drum assembly.
Figure 11:
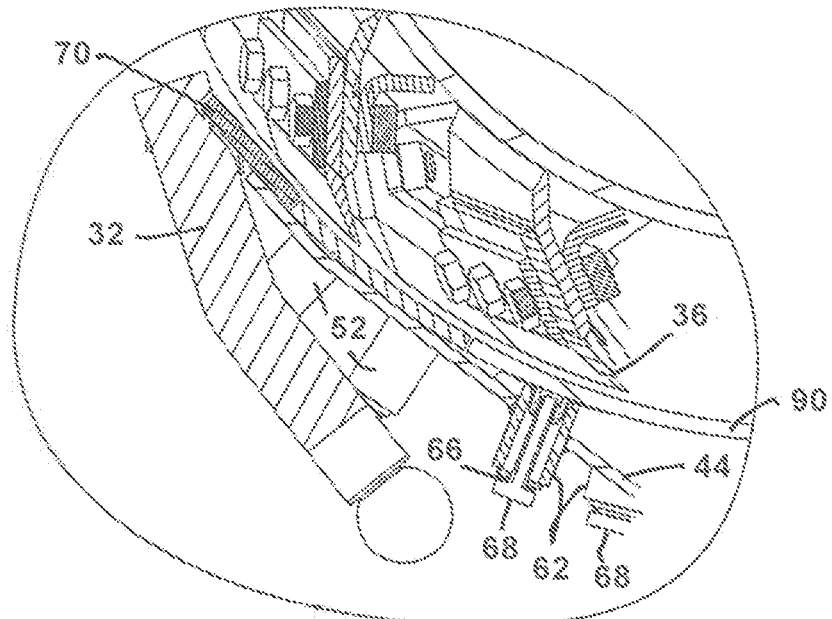
FIG. 11 shows a detail of a second section of a wear plate assembly displaced laterally from the first section of FIG. 10.

The wear plate assembly 40 further comprises a first element 70 extending laterally across the angled portion 44' of the generally planar portion 44 of the support element 42. The first element 70 is fixedly secured in position in relation to the support element 42 by any suitable method, for example by welding. The first element 70 may be of any suitable shape. In the illustrated embodiment, the first element is generally planar. The first element 70 is provided with a number of openings or windows 72. In the illustrated embodiment, two such windows 72 are provided. The windows 72 are used to secure and locate a pair of block elements 74. The block elements 74 may be secured in any suitable manner, for example by welding. Each of the block elements 74 is provided with a central through bore 76. In use the block elements 74 extend into suitably shaped openings in the shear bar holder 32. A pin or shaft 78 (FIG. 5A) extends though the shear bar holder and the bores 74 to provide an axis of rotation for the support 42 with respect to the shear bar holder 32.

A first removable wear plate 80 is releasably mounted on the generally planar portion 44 of the support element 42 next to the first element 70. It can be seen that, in the illustrated embodiment, the first removable wear plate 80 overlies the angled portion 44' adjacent the first element 70 and the first lateral region 44" of the generally planar portion 44 of the support 42. The first removable wear plate 80 is of arcuate form such that an inner surface of the first removable wear plate 80 follows the desired dimensions of the chopper drum assembly 10. In use, the inner surface of the first removable wear plate 80 sits flush with an inner surface of the adjacent first element 70. An outer surface of the first removable wear plate 80 is provided with a number of laterally spaced bosses 82, each boss being provided with a threaded inner bore 84. An outer surface 86 of each boss 82 may be of any suitable shape. Each boss is permanently secured to the outer surface of the first removable wear plate 80 in any suitable manner, for example by welding.

A second removable wear plate 90 is releasably mounted on the generally planar portion 44 of the support element 42 next to the first removable wear plate 80. The second removable wear plate 90 is of arcuate form such that the inner surface of the second removable wear plate 90 follows the desired dimensions of the chopper drum assembly 10. In use, the inner surface of the second removable wear plate 90 sits flush with the inner surface of the adjacent first removable wear plate 80. An outer surface of the second removable wear plate 60 is provided with a number of laterally spaced bosses 92, each boss 92 being provided with a threaded inner bore 94. An outer surface 96 of each boss 92 may be of any suitable shape. Each boss 92 is permanently secured to the outer surface of the second removable wear plate 90 in any suitable manner, for example by welding.

It will be appreciated that the bosses 82 on the outer side of the first removable plate 80 are adapted to be seated within a corresponding first opening 50 or an inner part of the tubular member 52 and that the bosses 92 on the outer side of the first removable plate 90 are adapted to be seated within a corresponding inner part of the tubular member 62. Thus while each may be of any suitable shape, the shapes are required to match.

In use a plurality of first threaded fasteners 58 are used to secure the first removable plate 80 in position and a plurality of second threaded fasteners 68 are used to secure the second moveable plate 90 in position (FIGS. 10 to 13).

An example fixing of the first removable wear plate 80 is illustrated in FIGS. 5, 5A, 10 and 11 where the first removable wear plate 80 is shown overlying the first planar region of the planar portion 44 of the support element 42. The outer surface of the boss 86 is located within an upper region of the generally tubular element 52. A threaded fastener 58 extends through a washer assembly 56 and the aperture 54 in the end of the generally tubular element 52 and engages with the threaded inner bore 84 of the boss 82 to draw the boss 82 into the generally tubular element 52 thereby securing the first removable plate 80 in position against the first planar region of the planar portion 44 of the support element 42. Any suitable washer assembly 56 may be used.

An example fixing of the second removable wear plate 90 is illustrated in FIGS. 5, 5A, 10 and 11 where the second removable wear plate 90 is shown overlying the second planar region of the planar portion 44 of the support element 42. The outer surface of the boss 92 is located within an upper region of the generally tubular element 62. A threaded fastener 68 extends through a washer assembly 66 and the aperture 64 in the end of the generally tubular element 62 and engages with the threaded inner bore 94 of the boss 92 to draw the boss 92 into the generally tubular element 62 thereby securing the second removable plate 80 in position against the second planar region of the planar portion 44 of the support element 42. Any suitable washer assembly 66 may be used.

As noted, the shear bar holder 32 is mounted to the frame and is rotatable with respect to the frame about the axis 33 extending through a lower part of the shear bar holder 32. This allows the upper end of the wear plate assembly to be located in a desired position. A wedge adjuster 100 can be located between an element 110 of the frame and the support surface 38 to locate a lower end of the wear plate assembly 40 with respect to the frame and the chopper drum 22. It will be appreciated that this adjustment can be conducted without affecting the location of the shear bar 30 (or the upper end of the wear plate assembly 40).

It can be seen in each case that the threaded fastener 58, 68 enters through the support element 42. In each case the threaded fastener 56, 58 is received within a blind bore former by the boss 82, 92 and the outer surface of the associated wear plate 80, 90. As such the threaded fastener 58, 68 cannot be exposed to the processed crop.

By releasing the wedge adjuster 100 and removing the wedge, the wear plate assembly is able to rotate about the shaft 78. In this way the lower end of the wear plate assembly 40 is lowered away from the chopper drum 10 to the position shown in FIGS. 12 and 13.

In order to remove a wear plate, an operator first loosens the associated threaded fasteners 58, 68 such that the free ends of the threaded fasteners 58, 68 no longer engage with the relevant threaded inner bore 84, 94. The wedge of the wedge adjuster 100 is removed allowing the lower end of the wear plate assembly 40 to be lowered. The wear plates 80, 90 can then be removed (as shown by the arrows in FIGS. 12 and 13). From FIGS. 12 and 13 it will be understood that it is easier to first remove the second removable plate 90 before removing the first removable plate 80. It will be understood that accessing the removeable wear plates 80, 90 in this way the operator does not need to obtain access to the interior of the chopper drum assembly.

Similarly, when replacing the replaceable wear plates 80, 90, it is easier to locate and place the first replaceable wear plate 80 once the second replaceable wear plate 90 has been removed.

Once the desired replaceable wear plate or plates have been replaced, the wedge of the wedge adjuster 100 is replaced and the wedge adjuster 100 adjusted such that the wear plate assembly 40 is in the desired position in relation to the chopper drum 22. The operator then tightens the screws 58, 68 as required. Any final adjustments to the wedge adjuster 100 can then be made.

It will be understood that should the screws 58, 68 work loose then they will fall out away from the chopper drum assembly 10 without a risk that they will fall into the flow of processed crop passing through the forage harvester 2.

Further, the matching shapes of the bosses 82, 92 and their associated tubular elements 52, 62 will tend to prevent the replaceable wear plates 80, 90 from working loose as a result of the operation of the forage harvester 2.

From reading the present disclosure, other modifications will be apparent to persons skilled in the art. Such modifications may involve other features which are already known in the field of self-propelled forage harvesters and component parts therefore and which may be used instead of or in addition to features already described herein.

The invention claimed is:

1. An agricultural harvester comprising:
   a rotatable chopper drum;
   a shear bar assembly having a shear bar, the shear bar assembly pivotably mounting the shear bar adjacent the chopper drum;
   a wear plate assembly comprising:
      a support element comprising a number of lateral regions, the support element being pivotably mounted to the shear bar assembly, wherein each of the lateral regions comprises a plurality of first engagement features;
      at least one replaceable wear plate having an inner side facing the chopper drum, wherein the replaceable wear plate is provided on an outer side with a plurality of second engagement features for engagement with the first engagement features; and
      a plurality of fasteners to secure the at least one replaceable wear plate to the support element through the first and second engagement features such that the plurality of fasteners do not pass through the inner side of the at least one replaceable wear plate.

2. The agricultural harvester of claim 1, wherein each of the first engagement features comprises a female fitting and each of the second engagement features comprises a male fitting for engagement with a respective female fitting.

3. The agricultural harvester of claim 1, wherein each of the first engagement features comprises a tubular member having an internal section and each of the second engagement features comprises a tubular member having an external section sized for seating within the internal section of a respective first engagement feature.

4. The agricultural harvester of claim 1, wherein each of the first engagement features comprises an end portion having a threaded opening, each of the second engagement features comprises an internal threaded opening, and each of the plurality of fastenings is a threaded fastening configured to engage with each of the threaded openings and the internal threaded openings to secure each of the replaceable wear plates to the support.

5. The agricultural harvester of claim 1, wherein the at least one replaceable wear plate comprises first and second replaceable wear plates.

6. A method of assembling a wear plate assembly adjacent a rotatable chopper drum comprising a support element having a number of lateral regions, wherein each of the lateral regions has a plurality of first engagement features, the method comprising:
   providing at least one replaceable wear plate with an inner side and an outer side, the outer side provided with a plurality of second engagement features for engagement with the first engagement features, and a plurality of fastening members to secure each of the replaceable wear plates to the support element through the engagement features
   locating the first replaceable wear plate with the inner side facing the chopper drum such that the second engagement features are seated within the first engagement features; and
   introducing each of the plurality of fastening members through an associated first engagement feature of the support element and into an associated second engagement feature to secure the first replaceable wear plate to the support element through the first and second engagement features such that each of the plurality of fasteners do not pass through the inner side of the at least one replaceable wear plate.

7. The method of claim 6, wherein the wear plate assembly includes a second replaceable wear plate, the method further comprising:
   locating the second replaceable wear plate such that the first engagement features are seated within the second engagement features;
   introducing each of the plurality of fastening members through the associated first engagement feature of the support element and into the associated second engagement feature to secure the second replaceable wear plate to the support element through the first and second engagement features.

* * * * *